(12) United States Patent
Haverinen et al.

(10) Patent No.: US 8,139,520 B2
(45) Date of Patent: Mar. 20, 2012

(54) METHOD OF PREVENTING OR LIMITING THE NUMBER OF SIMULTANEOUS SESSIONS IN WIRELESS LOCAL AREA NETWORK (WLAN)

(75) Inventors: Henry Haverinen, Jyväksylä (FI); Tao Haukka, Oulu (FI); Valtteri Niemi, Helsinki (FI)

(73) Assignee: Nokia Corporation (FI)

( * ) Notice: Subject to any disclaimer, the term of this patent is extended or adjusted under 35 U.S.C. 154(b) by 1182 days.

(21) Appl. No.: 10/838,564

(22) Filed: May 3, 2004

(65) Prior Publication Data

US 2005/0243719 A1 Nov. 3, 2005

(51) Int. Cl.
*H04W 4/00* (2009.01)
(52) U.S. Cl. ..... 370/328; 370/331; 370/338; 455/412.1; 455/412.2; 455/414.1; 455/435.1
(58) Field of Classification Search ............... 455/412.1, 455/412.2, 414.1, 435.1; 370/328, 331, 338
See application file for complete search history.

(56) References Cited

U.S. PATENT DOCUMENTS

| 5,345,595 | A | 9/1994 | Johnson et al. | |
|---|---|---|---|---|
| 5,978,669 | A | 11/1999 | Sanmugam | |
| 7,233,786 | B1 * | 6/2007 | Harris et al. | 455/412.1 |
| 2004/0236702 | A1 * | 11/2004 | Fink et al. | 705/73 |
| 2005/0018637 | A1 * | 1/2005 | Karoubalis et al. | 370/338 |
| 2005/0117524 | A1 * | 6/2005 | Lee et al. | 370/254 |

FOREIGN PATENT DOCUMENTS

| WO | WO 2004/015966 | 2/2004 |
|---|---|---|
| WO | WO 2004/029823 | 4/2004 |
| WO | WO 2004/105426 | 12/2004 |

OTHER PUBLICATIONS

3 GPP TR 33.817 V6.1.0 (Dec. 2004) Technical Report, 3rd Generation Partnership Project; Technical Specification Group Service and System Aspects; Feasibility Study on (U)SIM Security Reuse by Peripheral Devices on Local Interfaces (Release 6), Dec. 2004 3GPP, 39 pages.
$3^{rd}$ Generation Partnership Project; Technical Specification Group Services and System Aspects; 3GPP system to Wireless Local Area Network (WLAN) interworking; System description (Release 6), 3GPP Organization Partners, 2004, pp. 1-83.

\* cited by examiner

*Primary Examiner* — Olumide T Ajibade Akonai
*Assistant Examiner* — Jaime Holliday
(74) *Attorney, Agent, or Firm* — Banner & Witcoff, Ltd.

(57) ABSTRACT

A method, program product and system of preventing or limiting the number of simultaneous sessions in a wireless local area network (WLAN). The method includes: determining whether subscriber terminal information has been changed between an old session and a new session, maintaining a connection with the old session if the subscriber terminal information has not changed, and establishing and authenticating the new session and disconnecting the old session if the subscriber terminal information has changed. A medium access control (MAC) address and a WLAN radio network identification can be compared between the old session and the new session to determine whether subscriber terminal information has been changed.

21 Claims, 2 Drawing Sheets

METHOD OF PREVENTING OR LIMITING THE NUMBER OF SIMULTANEOUS SESSIONS IN WIRELESS LOCAL AREA NETWORK (WLAN)

BACKGROUND OF THE INVENTION

A. Field of the Invention

The present invention is directed to systems and methods for wireless network communications, and specifically to preventing or limiting the number of simultaneous wireless local area network sessions.

B. Background

3rd Generation Partnership Project (3GPP) wireless local area network (WLAN) interworking specifies several different interworking scenarios. Scenario 2 specifies, among other things, network access authentication based on the Extensible Authentication Protocol (EAP). In the radio interface, the IEEE 802.11i protocol is used. The WLAN access network communicates with the backend authentication server using an Authentication, Authorization and Accounting (AAA) protocol. The current working assumption is Diameter. As a result of the authentication, a Pairwise Master Key (PMK) is shared by the terminal and a WLAN Access Point (AP).

In the 3GPP architecture, the EAP is executed by the terminal and an AAA server in the home operator's network. The home operator can have several AAA servers, for example, for load balancing reasons. The AAA server also registers all WLAN sessions with the centralized Home Subscription Server (HSS).

IEEE 802.11i specifies the concepts of Pairwise Master Key caching and pre-authentication. In pre-authentication, the terminal can authenticate with several APs (AP2, AP3, . . . ) while associated with a single AP (AP1). The AP1 with which the terminal is associated relays authentication information to the other APs (AP2, AP3, . . . ), in other words, the terminal is not in radio communications with AP2, AP3, . . . .

The purpose of pre-authentication is to enable the terminal and other APs to establish Pairwise Master Keys in advance, so that handovers can later be performed quickly. PMK caching refers to the procedure where the terminal maintains copies of PMKs shared with several APs, and is able to quickly handover back to previously visited APs.

According to one embodiment of the invention, the inventors have determined that it would be advantageous to limit the number of scenario 2 sessions to at most one session per subscriber in order to eliminate certain fraud scenarios. For example, a malicious user might buy a subscription, share the subscription with a large number of users and later refuse to pay the incurred bills. Another example is that a malicious use buys a flat-rate subscription, and charges for connectivity provided for other users. Current WLAN implementations do not try to prevent simultaneous sessions with the same user credentials.

The Diameter protocol supports server-initiated disconnect operation whereby the AAA server can disconnect a session. The 3GPP technical standard (TS 23.234) also describes a procedure by which the HSS can indicate the current AAA server to disconnect the WLAN scenario 2 session. When simultaneous sessions are to be prevented, it would be advantageous to disconnect the old sessions when a new session is established, rather than to block new session attempts when there is an ongoing session. Blocking new session attempts would be problematic because it may be difficult to close all WLAN sessions in a timely manner. The valid user might have left the radio coverage of some previous WLAN network without explicitly closing the session, so an old WLAN session might still be dangling. Such dangling sessions should not prevent the user from creating new sessions.

However, the main problem in closing the old sessions upon establishment of new sessions is the fact that due to pre-authentication and PMK caching, WLAN authentication exchanges do not have a one-to-one correspondence to WLAN sessions. When the user pre-authenticates with an AP, the AAA server should not close the connection with the original AP. Hence it is unclear when the old WLAN sessions can be closed without disturbing the operation of pre-authentication.

SUMMARY OF THE INVENTION

The present invention is directed to preventing or limiting the number of simultaneous wireless local area network sessions. One exemplary embodiment of the present invention discloses a method, program product and system, of preventing simultaneous sessions in a wireless local area network (WLAN). The method includes: determining whether subscriber terminal information has been changed between an old session and a new session, maintaining a connection with the old session if the subscriber terminal information has not changed, and establishing and authenticating the new session and disconnecting the old session if the subscriber terminal information has changed. A medium access control (MAC) address and a WLAN radio network identification can be compared between the old session and the new session to determine whether subscriber terminal information has been changed.

In another exemplary embodiment, the present invention provides a method, program product and system of preventing simultaneous sessions in excess of a predetermined number in a wireless local area network. The method includes: determining that a new session of a subscriber exceeds the predetermined number of simultaneous sessions allowed, selecting a preceding session from the simultaneous sessions, determining whether subscriber terminal information has been changed between the preceding session and the new session, maintaining a connection with the preceding session if the subscriber terminal information has not changed, and establishing and authenticating the new session and disconnecting the preceding session if the subscriber terminal information has changed.

In yet another exemplary embodiment, the present invention provides a method, program product and system of conditionally allowing simultaneous sessions for a given user equipment (UE) in a wireless local area network (WLAN). The method includes: determining whether a visited public land mobile network (VPLMN) for the UE is different between an old session and a new session and establishing and authenticating the new session while maintaining the old session if said VPLMNs of the old and new sessions are the same. If the VPLMNs of the old and new sessions are different, the following steps are performed: determining whether subscriber terminal information has been changed between an old session and a new session, maintaining a connection with the old session if the subscriber terminal information has not changed, and establishing and authenticating the new session and disconnecting the old session if the subscriber terminal information has changed.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF EXEMPLARY EMBODIMENTS

In an exemplary embodiment, the present invention detects the establishment of a new Wireless Local Area Network (WLAN) session, at an Authentication, Authorization, Accounting (AAA) server or the Home Subscription Server (HSS), based on at least the terminal Medium Access Control (MAC) address and some identification of the WLAN radio network. If the terminal's MAC address or the identification of the radio network has changed, then the session that is being established is considered to be a new session, so any old sessions can be closed. If these parameters have not changed, then the authentication exchange is related to a handover, re-authentication or pre-authentication in a previously established session, so there is no need to close the previous session.

The terminal MAC address and the WLAN radio network identification may both be received over the AAA protocol upon WLAN authentication exchange. The MAC address is included in the AAA packets even according to current AAA protocols. A WLAN radio network identifier can be specified to be transported in the AAA messages, mainly in order to be able to produce detailed and itemized bills about WLAN usage with WLAN network identification information to the end users.

In an exemplary embodiment of the invention, the terminal MAC address is compared because if the terminal equipment changes, for example, if the user moves the smart card to a new terminal, then it is to be considered a new session even if the radio network did not change.

Also in an exemplary embodiment of the invention, WLAN radio network identification is compared because simultaneous sessions with the same MAC address in different radio networks need to be prevented. The radio network identification is an identifier that uniquely identifies the WLAN access network; in other words, the access points that provide connectivity to the same wired Distribution System (DS) so that the terminal can move within the WLAN radio network without losing its layer-2 connectivity. All the WLAN access points that belong to the same network are associated with the same WLAN radio network identification.

WLAN radio network implementations already prevent having simultaneous sessions with the same MAC address. The access points (APs) usually use an Inter Access Point Protocol (IAPP) to notify each other when an association with a certain terminal MAC address is established. If some other access point also has an association, it will disassociate because it interprets it as the terminal having moved to a new access point (AP).

Figure 1:
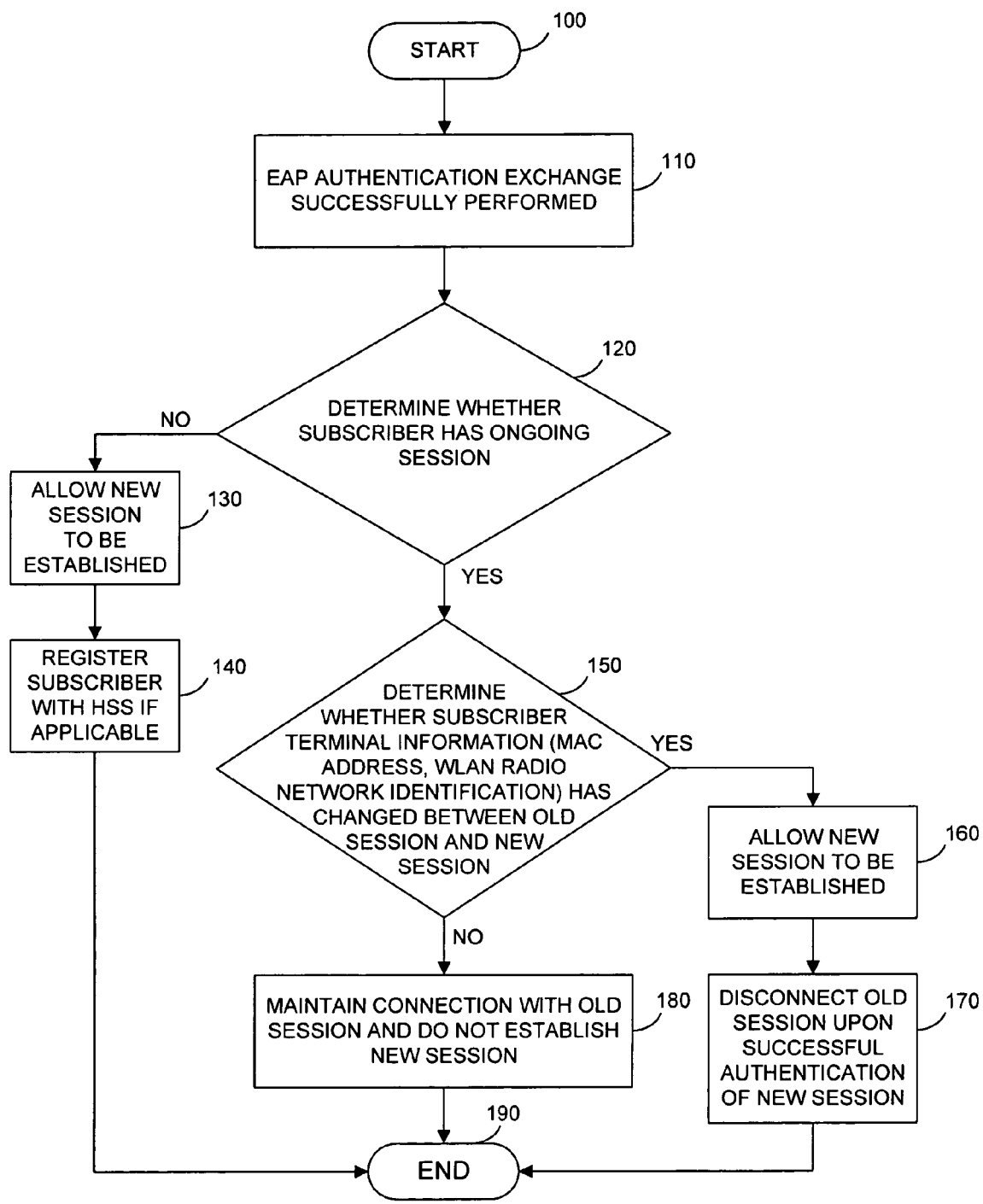
FIG. 1 is a flowchart illustrating basic prevention of simultaneous WLAN sessions under an exemplary embodiment of the present invention.

In detail, the present invention can be implemented on a server, and in an exemplary embodiment, an AAA server in the following manner. Reference is made to the flowchart of FIG. 1 which illustrates basic prevention of simultaneous WLAN sessions under an exemplary embodiment of the present invention.

Upon the start 100 of the process and when an EAP authentication exchange 110 is successfully performed, the AAA server checks whether the same subscriber already has an ongoing session in step 120. If the subscriber does not have an ongoing session, then the AAA server allows the new session to be established in step 130. If a 3rd Generation Partnership Project (3GPP) release 6 HSS is being used, then the AAA server also registers the subscriber with the HSS in step 140. The AAA server may do this even if it has previously registered with the HSS just to make sure there is an active registration. In an exemplary embodiment of the invention, the information registered with the HSS includes at least the terminal's MAC address and WLAN radio network identification.

If the AAA server detects in step 120, after successful authentication in step 110, that the subscriber already has an ongoing session, then the AAA server compares, in step 150, the terminal's current MAC address and/or the WLAN radio network identification with the corresponding information about the old session. Alternatively, some other identification of the new session can be used to compare the new and old sessions.

If the information has not changed, then the AAA server, in step 180, maintains the old session and does not establish a new session. If the information has changed, then the AAA server disconnects the old session in step 170 after the new session has been successfully established in step 160 and authenticated. The process ends in step 190.

In another exemplary embodiment, the HSS implements the invention as follows. When an AAA server registers a session with the HSS, the HSS checks whether the subscriber already has an ongoing session. There can be a session with the same AAA server or some other AAA server. If an existing session is found, then the HSS compares the terminal's current MAC address, WLAN radio network identification, and possibly some other identification of the new session with the corresponding information about the old session. If the information has not changed, then the HSS does not disconnect the old session. If the information has changed, then the HSS transmits a message to the AAA server of the old session to disconnect the old session.

In another exemplary embodiment of the invention, the AAA server and the HSS do not necessarily have to restrict the number of simultaneous services to one but they can allow a limited number of simultaneous sessions. For example, two simultaneous sessions might be allowed so that the user can use two separate devices, such as a phone and a laptop, at the same time. This would require the HSS (or the AAA server) to keep track of the number of simultaneous sessions, and close one of the preceding sessions whenever the number of allowed sessions is exceeded. In this case, sessions can be detected based on the terminal's MAC address and WLAN radio network identification, just as in the general case. In another embodiment of the invention, the oldest session is chosen as the preceding session that would be closed.

In another exemplary embodiment of the invention, it is also possible to allow simultaneous sessions only if a certain condition is met. An example of such alternative logic follows. This time, simultaneous sessions from the same User Equipment (UE) are allowed on the condition that the visited public land mobile networks (VPLMNs) are different. Loosening the requirement like this does not increase the fraud potential significantly but, on the other hand, there may be significant advantages, e.g. a useful combination of services may be accessible this way. In this embodiment, the HSS checks the VPLMN identities. If these identities do not match for two sessions then simultaneous sessions are allowed. This is irrespective of whether the WLAN access network identities match. There may be an additional optional requirement that the MAC addresses have to match in order for the simultaneous sessions to be allowed. If the VPLMN identities do not match, then the procedure of this embodiment of the invention follows that described above with reference to FIG. 1.

Figure 2:
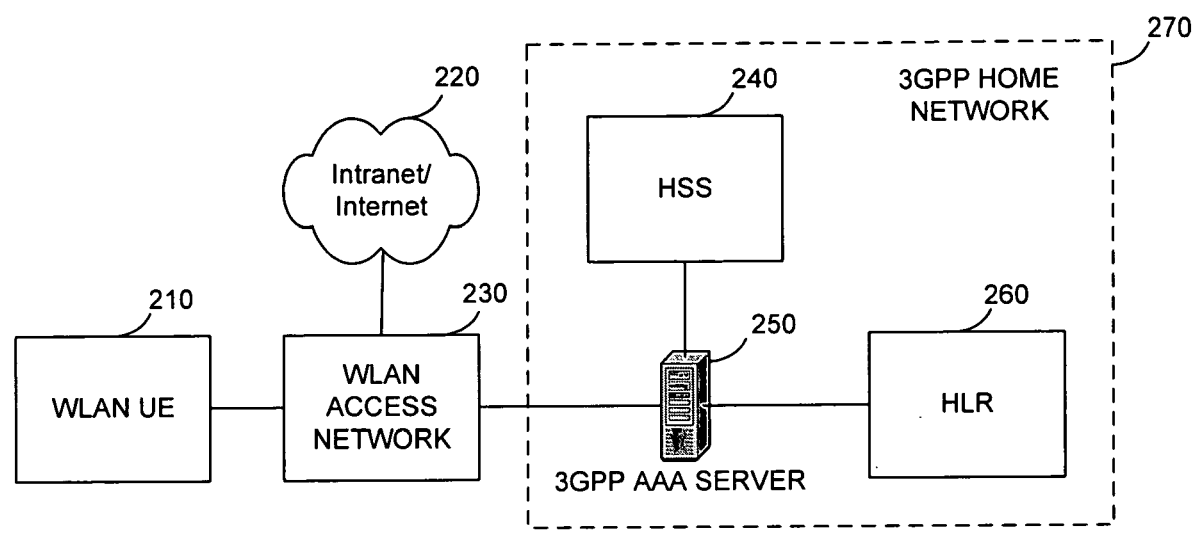
FIG. 2 is a diagram illustrating a system in which an exemplary embodiment of the present invention can be implemented.

FIG. 2 is a diagram illustrating a system in which an exemplary embodiment of the present invention can be implemented. In this figure, the WLAN user equipment (UE) is shown as element 210. The WLAN access network 230 is connected to the Intranet or Internet 220 and the WLAN UE 210. It is also connected to the 3GPP AAA server 250. The server includes modules in which the method of exemplary embodiments of the present invention are implemented. This server is connected to the HSS 240 and the Home Location Register (HLR) 260. These two elements and the server 250 comprise the 3GPP Home Network 270.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principals of the present invention and its practical application to enable one skilled in the art to utilize the present invention in various embodiments and with various modifications as are suited to the particular use contemplated.

What is claimed is:

1. A method comprising:
   determining whether subscriber terminal information has been changed between an ongoing session and a new session to be established at least in part by comparing a medium access control address for the ongoing session with a medium access control address for the new session and comparing a wireless local area network identification for the ongoing session with a wireless local area network identification for the new session;
   dependent on the determination of whether subscriber terminal information has been changed, selecting, by a computing device, between maintaining a connection with the ongoing session and establishing the new session;
   upon selecting to establish the new session, establishing the new session, wherein establishing the new session comprises authenticating the new session and disconnecting the ongoing session, and wherein establishing the new session is responsive to determining that the subscriber terminal information has changed.

2. The method according to claim 1, wherein comparing the medium access control address for the ongoing session with the medium access control address for the new session and comparing the wireless local area network identification for the ongoing session with the wireless local area network identification for the new session results in the determination of whether subscriber terminal information has been changed.

3. The method according to claim 1, wherein the determining of whether subscriber terminal information has been changed comprises determining whether the subscriber terminal has the ongoing session; and
   wherein selecting to establish the new session is based on the determination of whether the subscriber terminal has the ongoing session.

4. The method according to claim 3, wherein establishing the new session comprises registering said subscriber terminal with a home subscription server.

5. The method according to claim 1, wherein the computing device is an authentication, authorizing and accounting server.

6. The method according to claim 1, wherein the determining of whether subscriber terminal information has been changed is performed by a home subscription server and wherein the computing device is an authentication, authorizing and accounting server.

7. A method comprising:
   determining that a new session to be established for a subscriber terminal exceeds a predetermined number of simultaneous sessions allowed;

selecting an ongoing session from a plurality of simultaneous sessions;
determining whether subscriber terminal information has been changed between the ongoing session and the new session at least in part by comparing a medium access control address for the ongoing session with a medium access control address for the new session and comparing a wireless local area network identification for the ongoing session with a wireless local area network identification for the new session;
based on the determination of whether subscriber terminal information has been changed, selecting, by a computing device, between maintaining a connection with the ongoing session and establishing the new session;
upon selecting to establish the new session, establishing the new session, wherein establishing the new session comprises authenticating the new session and disconnecting the ongoing session, and wherein establishing the new session is responsive to determining that the subscriber terminal information has changed.

8. The method according to claim 7, wherein the oldest of said simultaneous sessions is selected as said ongoing session.

9. A method comprising:
determining whether a visited public land mobile network for a user equipment is different between an ongoing session and a new session to be established;
based on the determination of whether the visited public land mobile network for the user equipment is different, selecting, by a computing device, between performing:
establishing the new session, wherein establishing the new session comprises authenticating the new session, and
maintaining the ongoing session;
and performing:
determining whether subscriber terminal information has been changed between the ongoing session and the new session at least in part by comparing a medium access control address for the ongoing session with a medium access control address for the new session and comparing a wireless local area network identification for the ongoing session with a wireless local area network identification for the new session,
based on the determination of whether subscriber terminal information has been changed, selecting, by a computing device, between maintaining a connection with the ongoing session and establishing the new session, and
in response to determining that the subscriber terminal information has changed, selecting to establish the new session, wherein establishing the new session comprises authenticating the new session and disconnecting the ongoing session.

10. A computer readable medium storing computer-executable instructions configured to, when executed, cause an apparatus to at least:
determine whether subscriber terminal information has been changed between an ongoing session and a new session to be established at least in part by comparing a medium access control address for the ongoing session with a medium access control address for the new session and comparing a wireless local area network identification for the ongoing session with a wireless local area network identification for the new session;
based on the determination of whether the subscriber terminal information has been changed, select between maintaining a connection with the ongoing session and establishing the new session, wherein establishing the new session comprises authenticating the new session and disconnecting the ongoing session.

11. The computer readable medium according to claim 10, wherein comparing the medium access control address for the ongoing session with the medium access control address for the new session and comparing the wireless local area network identification for the ongoing session with the wireless local area network identification for the new session results in the determination of whether the subscriber terminal information has been changed.

12. A computer readable medium storing computer-executable instructions configured to, when executed, cause an apparatus to at least:
determine that a new session to be established of a subscriber terminal exceeds a predetermined number of simultaneous sessions allowed;
select an ongoing session from a plurality of simultaneous sessions;
determine whether subscriber terminal information has been changed between the ongoing session and the new session at least in part by comparing a medium access control address for the ongoing session with a medium access control address for the new session and comparing a wireless local area network identification for the ongoing session with a wireless local area network identification for the new session;
based on the determination of whether subscriber terminal information has been changed, select between maintaining a connection with the ongoing session and establishing the new session, wherein establishing the new session comprises authenticating the new session and disconnecting the ongoing session.

13. A computer readable medium storing computer-executable instructions configured to, when executed, cause an apparatus to at least:
determine whether a visited public land mobile network for a user equipment is different between an ongoing session and a new session to be established;
based on the determination of whether the visited public land mobile network for the user equipment is different, select between performing:
establishing the new session, wherein establishing the new session comprises authenticating the new session, and
maintaining the ongoing session;
and performing:
determining whether subscriber terminal information has been changed between the ongoing session and the new session at least in part by comparing a medium access control address for the ongoing session with a medium access control address for the new session and comparing a wireless local area network identification for the ongoing session with a wireless local area network identification for the new session, and
based on the determination of whether subscriber terminal information has been changed, selecting between maintaining a connection with the ongoing session, and establishing the new session, wherein establishing the new session comprises authenticating the new session and disconnecting the ongoing session.

14. An apparatus comprising:
a processor;
a memory storing computer-executable instructions, the computer executable instructions configured to, with the processor, cause the apparatus to at least:

receive a new session request from a subscriber terminal;
determine whether subscriber terminal information has been changed between an ongoing session and a new session to be established at least in part by comparing a medium access control address for the ongoing session with a medium access control address for the new session and comparing a wireless local area network identification for the ongoing session with a wireless local area network identification for the new session;
based on the determination of whether the subscriber terminal information has been changed, select between maintaining a connection with the ongoing session and establishing the new session, wherein establishing the new session comprises authenticating the new session and disconnecting the ongoing session.

15. The apparatus according to claim 14, wherein comparing the medium access control address for the ongoing session with the medium access control address for the new session and comparing the wireless local area network identification for the ongoing session with the wireless local area network identification for the new session results in the determination of whether the subscriber terminal information has been changed.

16. An apparatus comprising:
means for determining whether subscriber terminal information has been changed between an ongoing session and a new session to be established at least in part by comparing a medium access control address for the ongoing session with a medium access control address for the new session and comparing a wireless local area network identification for the ongoing session with a wireless local area network identification for the new session;
means for selecting, based on the determination of whether the subscriber terminal information has been changed, between maintaining a connection with the ongoing session and establishing the new session, wherein establishing the new session comprises authenticating the new session and disconnecting the ongoing session.

17. The apparatus according to claim 16, further comprising means for comparing at least one of the medium access control address and the wireless local area network radio network identification between the ongoing session and the new session.

18. An apparatus comprising:
means for determining that a new session to be established of a subscriber terminal exceeds a predetermined number of simultaneous sessions allowed;
means for selecting an ongoing session from a plurality of simultaneous sessions;
means for determining whether subscriber terminal information has been changed between the ongoing session and the new session at least in part by comparing a medium access control address for the ongoing session with a medium access control address for the new session and comparing a wireless local area network identification for the ongoing session with a wireless local area network identification for the new session;
means for selecting, based on the determination of whether the subscriber terminal information has been changed, between maintaining a connection with the ongoing session and establishing the new session, wherein establishing the new session comprises authenticating the new session and disconnecting the ongoing session.

19. An apparatus comprising:
means for determining whether a visited public land mobile network for a user equipment is different between an ongoing session and a new session to be established;
means for selecting, based on the determination of whether the visited public land mobile network for the user equipment is different, between performing:
establishing the new session, wherein establishing the new session comprises authenticating the new session, and
maintaining the ongoing session;
and performing:
determining whether subscriber terminal information has been changed between the ongoing session and the new session at least in part by comparing a medium access control address for the ongoing session with a medium access control address for the new session and comparing a wireless local area network identification for the ongoing session with a wireless local area network identification for the new session, and
based on the determination of whether the subscriber terminal information has been changed, selecting between maintaining a connection with the ongoing session, and establishing the new session, wherein establishing the new session comprises authenticating the new session and disconnecting the ongoing session.

20. An apparatus comprising:
a processor;
a memory storing computer-executable instruction configured to, with the processor, cause the apparatus to at least:
determine that a new session to be established of a subscriber terminal exceeds a predetermined number of simultaneous sessions allowed;
select an ongoing session from a plurality of simultaneous sessions;
determine whether subscriber terminal information has been changed between the ongoing session and the new session at least in part by comparing a medium access control address for the ongoing session with a medium access control address for the new session and comparing a wireless local area network identification for the ongoing session with a wireless local area network identification for the new session;
based on the determination of whether the subscriber terminal information has been changed, select between maintaining a connection with the ongoing session and establishing the new session, wherein establishing the new session comprises authenticating the new session and disconnecting the ongoing session.

21. An apparatus comprising:
a processor;
a memory storing computer-executable instructions configured to, with the processor, cause the apparatus to:
determine whether a visited public land mobile network for a user equipment is different between an ongoing session and a new session to be established;
based on the determination of whether the visited public land mobile network for the user equipment is different, select between performing:

establishing the new session, wherein establishing the new session comprises authenticating the new session, and maintaining the ongoing session;

and performing:

determining whether subscriber terminal information has been changed between the ongoing session and the new session at least in part by comparing a medium access control address for the ongoing session with a medium access control address for the new session and comparing a wireless local area network identification for the ongoing session with a wireless local area network identification for the new session;

based on the determination of whether the subscriber terminal information has been changed, selecting between maintaining a connection with the ongoing session, and establishing the new session, wherein establishing the new session comprises authenticating the new session and disconnecting the ongoing session.

* * * * *